Dec. 22, 1970     J. A. DUCEY ET AL     3,548,424
VENTILATED WATER CLOSET

Filed Feb. 29, 1968     8 Sheets-Sheet 1

INVENTORS
James A. Ducey
Willard G. Young
BY
Sommer & Weber
ATTORNEYS

INVENTORS
James A. Ducey
Willard G. Young
BY
Sommer & Weber
ATTORNEYS

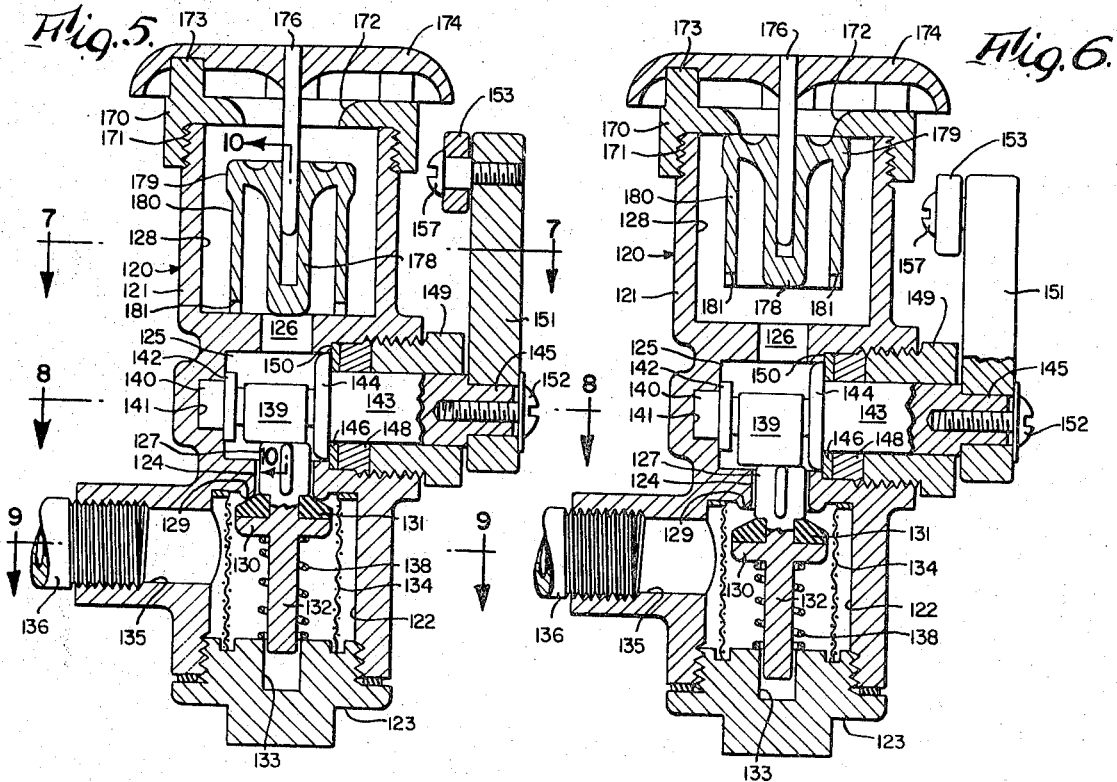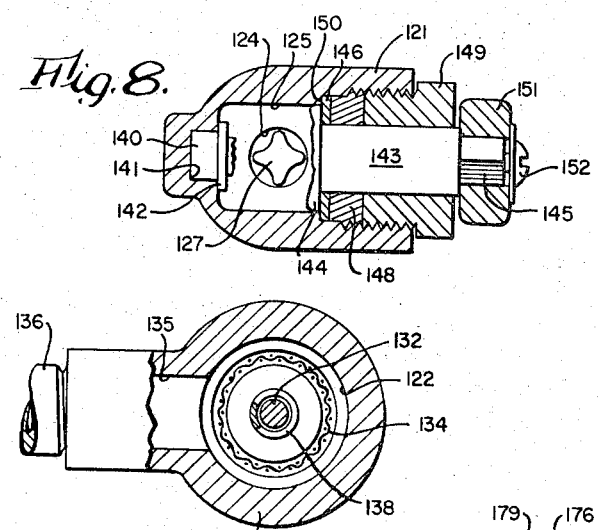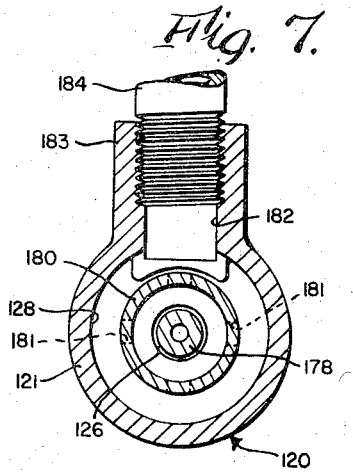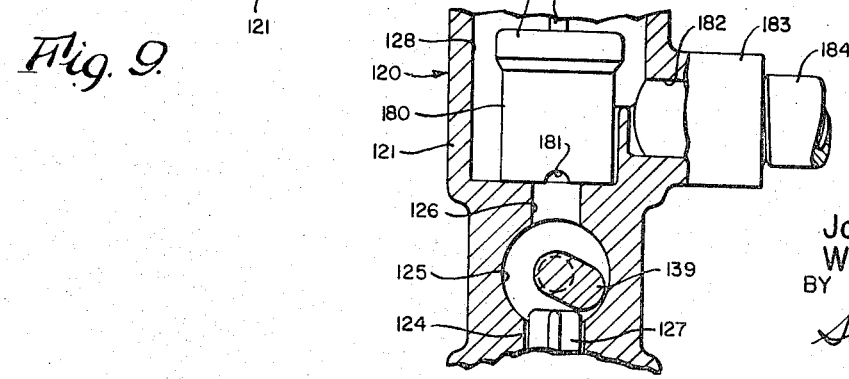

Dec. 22, 1970    J. A. DUCEY ET AL    3,548,424
VENTILATED WATER CLOSET
Filed Feb. 29, 1968    8 Sheets-Sheet 4

INVENTORS
James A. Ducey
Willard G. Young
BY
Sommer & Weber
ATTORNEYS

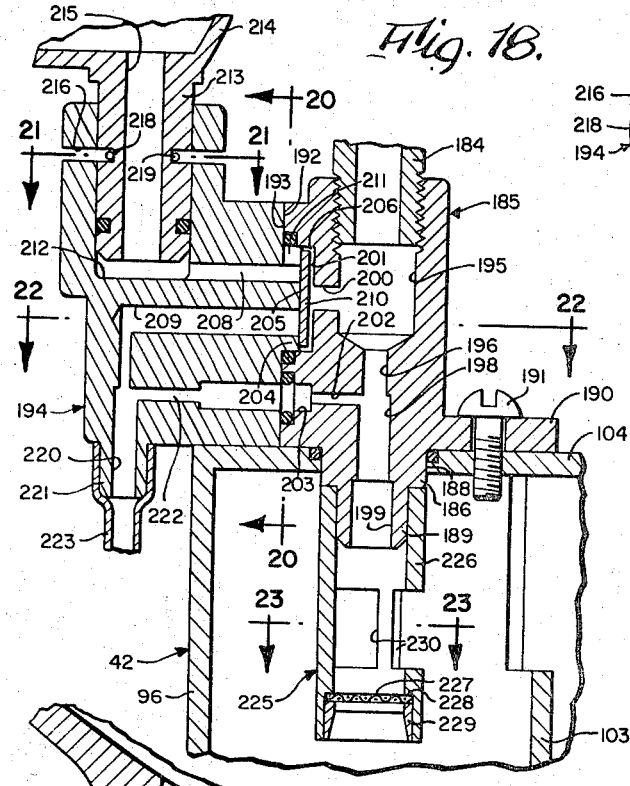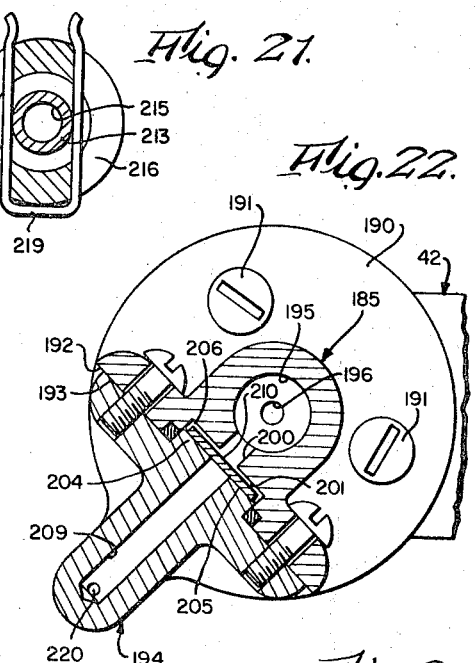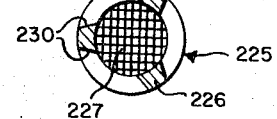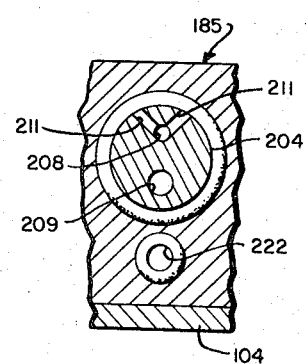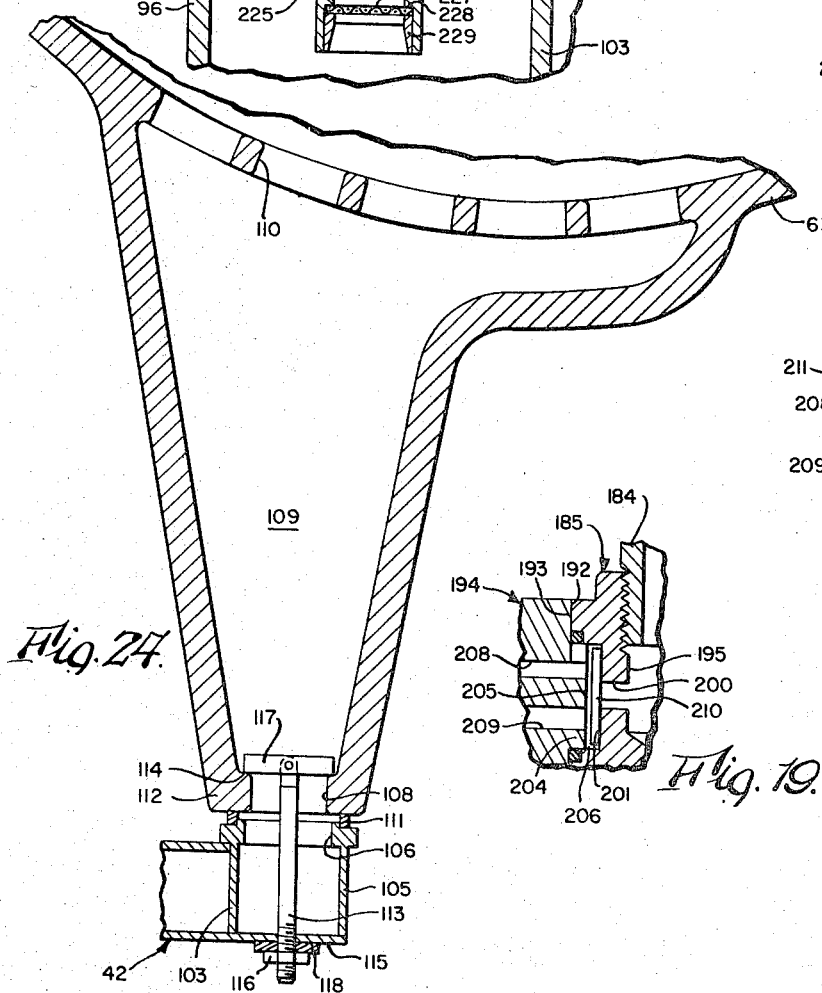
INVENTORS
James A. Ducey
Willard G. Young
BY
Sommer & Weber
ATTORNEYS

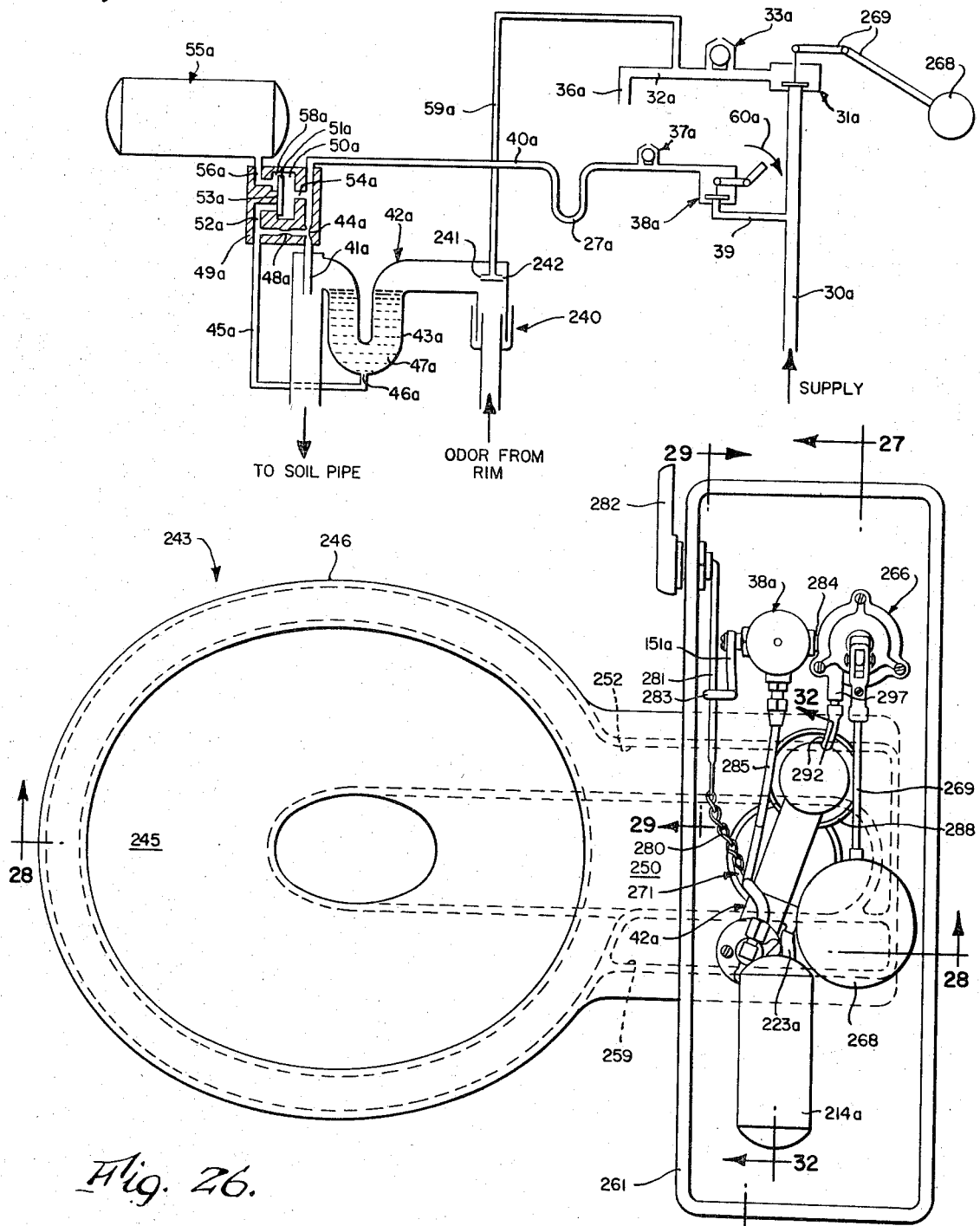

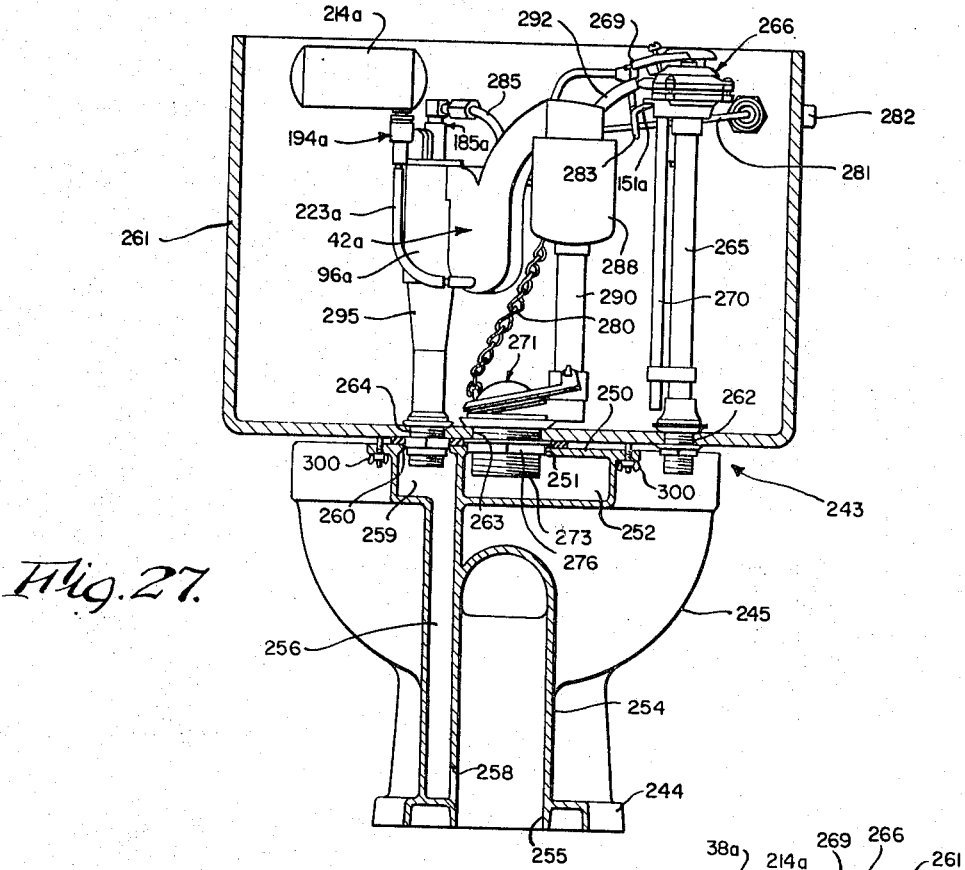
Fig. 27.
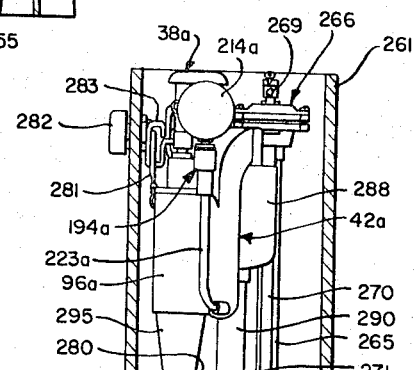
Fig. 28.
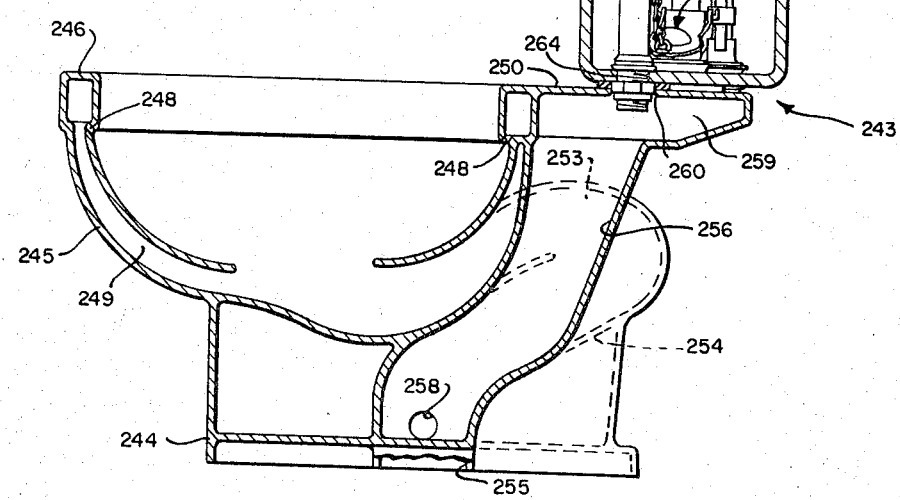

Dec. 22, 1970   J. A. DUCEY ET AL   3,548,424
VENTILATED WATER CLOSET
Filed Feb. 29, 1968   8 Sheets-Sheet 8

United States Patent Office 3,548,424
Patented Dec. 22, 1970

3,548,424
VENTILATED WATER CLOSET
James A. Ducey and Williard G. Young, Robinson, Ill.,
assignors to Case Manufacturing Company, Robinson,
Ill., a corporation of Illinois
Filed Feb. 29, 1968, Ser. No. 709,369
Int. Cl. E03d 9/05
U.S. Cl. 4—215                             8 Claims

ABSTRACT OF THE DISCLOSURE

A ventilated water closet is provided in which a passage between an opening in the wall of the bowl and the soil pipe duct is formed with a trapway normally containing a water seal to block communication between such duct and bowl but water operated means selectively operable remove the water seal when desired and aspirate the bowl through the passage following which fresh water is used to reestablish the water seal.

BACKGROUND OF THE INVENTION

Ventilated water closets are known. For example, one disclosed in Pat. No. 3,188,658 but this has the disadvantage of reusing the same water for the water seal in the trapway in the ventilator passage. Such water, being exposed to the soil pipe duct, may become contaminated and odoriferous and this is undesirable.

SUMMARY OF THE INVENTION

The present invention provides an improved ventilated water closet which has as one of its important advantages the feature of using fresh water to reestablish the water seal in the trapway of the ventilator passage, and thereby the disadvantage of the aforementioned known ventilated water closet is overcome.

Another advantage of the present invention is to doubly assure reestablishment of the water seal in the ventilator trapway following termination of bowl ventilation.

A further advantage of the present invention is to provide effective and efficient water operated aspiration of the closet bowl during ventilation of the same.

Still another advantage of the present invention is to deactivate automatically the selectively operable bowl ventilating mechanism when the water closet is flushed.

Other advantages of the present invention will be apparent from the following detailed description of preferred embodiments illustrated in the accompanying drawings.

BRIEF DESCRIPTION OF THE DRAWINGS

FIG. 5 is an enlarged vertical sectional view of the selectively operable valve means and associated atmospheric vent means of the water closet ventilating system, and showing the valve in a closed condition, this figure being taken on line 5—5 of FIG. 3.

FIG. 6 is a view similar to FIG. 5 and showing the valve in an open condition.

FIG. 7 is a horizontal sectional view thereof taken on line 7—7 of FIG. 5.

FIG. 8 is a horizontal sectional view thereof taken on line 8—8 of FIG. 5.

FIG. 9 is a horizontal sectional view thereof, partly in elevation, taken on line 9—9 of FIG. 5.

FIG. 10 is a fragmentary vertical sectional view thereof, partly in elevation, taken on line 10—10 of FIG. 5.

FIG. 18 is an enlarged fragmentary vertical sectional view through another part of the ventilating apparatus and showing a valve closure in one position, taken generally on line 18—18 of FIG. 2.

FIG. 19 is a fragmentary view similar to FIG. 18 and showing the aforementioned valve closure in another position.

FIG. 20 is a fragmentary vertical transverse sectional view thereof taken on line 20—20 of FIG. 18.

FIG. 21 is a horizontal sectional view thereof taken on line 21—21 of FIG. 18.

FIG. 22 is a horizontal sectional view thereof taken on line 22—22 of FIG. 18.

FIG. 23 is a horizontal sectional view thereof taken on line 23—23 of FIG. 18.

FIG. 24 is an enlarged fragmentary horizontal sectional view through the rear wall portion of the water closet bowl and showing a ventilating passage for the bowl and also showing other parts of the ventilating system associated therewith.

FIG. 25 is a schematic diagram of the inventive ventilating system as applied to a close-coupled tank and water closet combination and illustrating another embodiment of the present invention.

FIG. 26 is a top elevational view of the water closet referred to in the description of FIG. 25 and illustrating the same with the cover for the flush tank removed.

FIG. 27 is a vertical transverse sectional view thereof taken generally on line 27—27 of FIG. 26.

FIG. 28 is a vertical longitudinal sectional view thereof taken generally on line 28—28 of FIG. 26.

DESCRIPTION OF THE PREFERRED EMBODIMENTS, FIGS. 1–24

Figure 1:
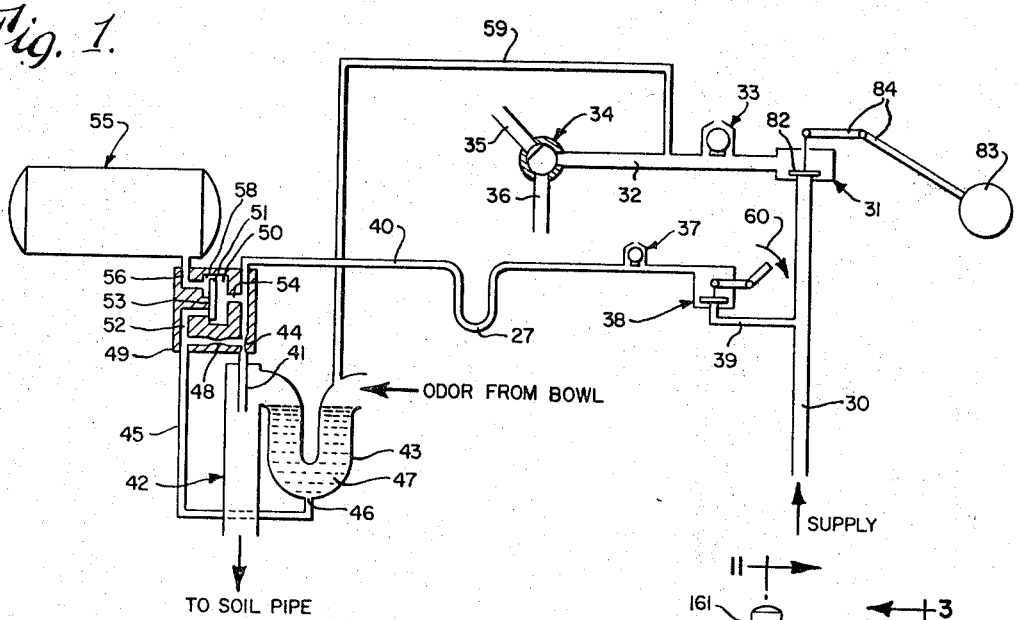
FIG. 1 is a schematic diagram of a water closet ventilating system as applied to a water closet having an integral water tank and illustrating one embodiment of the present invention.

The diagram shown in FIG. 1 illustrates schematically the principle of the ventilating system of the present invention as applied to a water closet having a bowl and integral flush tank, the bottom of which tank is below the rim of the bowl. The general construction of such a water closet known as a one-piece closet is shown in pertinent part in FIGS. 2–4. However, it is believed that a general understanding of the ventilating system as schematically represented in FIG. 1 will produce a clearer understanding of the detailed structure features.

Accordingly, referring to FIG. 1, the numeral 30 represents a water supply pipe which leads to a float operated ballcock 31. A water or ballcock outlet conduit 32 from this ballcock 31 is shown as having an atmospheric vent device 33 therein and leads to a diverter valve 34 which by the position of its movable element will divert water either through branch conduit 35 to the closet bowl rim or through branch conduit 36 to fill the closet flush tank.

The numeral 38 represents generally a selectively operable valve device having an inlet and an outlet. This inlet is connected via conduit 39 to water supply pipe 30 upstream of ballcock 31. The outlet of valve device 38 is shown as connected to a conduit 40 having an atmospheric vent device 37 operatively arranged therein and also a U-shaped trapway 27. The remote end of conduit 40 is connected to an aspirating nozzle 41 arranged in a ventilator passage device represented generally by the numeral 42. This device 42 includes a U-shaped trapway 43. One end of this trapway is suitably connected with the bowl of the water closet above the normal level of water maintained therein. The other end of this trapway 43 is communicatively connected to the soil pipe which carries away waste matter discharged from the closet bowl. The trapway 43 normally contains a body of water 47 which is at a level sufficient to provide a water seal which blocks communication between the soil pipe and the closet bowl.

When valve 38 is selectively operated, the pressurized water allowed to flow through conduit 40 is effective to remove water 47 sealing trapway 43. For this purpose, conduit 40 has a restriction 44 therein. Connected to this restriction or throat is a second conduit 45. This second conduit leads from the bottom of trapway 43 as indicated at 46 and communicatively connects with restriction 44. This second conduit 45 itself has a restriction 48 therein for a purpose which will be explained later. The restrictions 44 and 48 as well as part of the conduits 40 and 45 are shown in FIG. 1 as being formed as passages in a body member 49. This member 49 is also internally formed to provide the valve chamber 50 in which a movable free-floating valve closure 51 is arranged.

A third conduit 52 is communicatively connected to conduit 45 between restriction 48 and trapway 43. The other end of conduit 52 terminates in a seat 53 adapted to be closed by closure 51. A fourth conduit 54 communicatively connects chamber 50 to conduit 40, upstream of restriction 44. The numeral 55 represents a closed receptacle or tank to the bottom of which is communicatively connected a fifth conduit 56. The other end of this conduit 56 communicatively connects with chamber 50 so as to communicate with conduit 54, this being achieved by a by-pass 58 provided adjacent seat 53.

Another conduit 59 is shown as communicatively connected to ballcock outlet conduit 32 between atmospheric vent device 37 and diverter valve 34 and at its other end as communicatively connected to trapway 43 adjacent its upper end.

Assuming that the various movable parts are in the condition represented in FIG. 1 and that there exists water seal 47 in trapway 43, valve device 38 is now manipulated in the direction of arrow 60. This opens the valve and establishes communication between conduits 39 and 40, supplying pressurized water derived from supply pipe 30 to aspirator nozzle 41. Water discharged through aspirator nozzle 41 causes a flow of gas from the closet bowl toward the soil pipe and this is effective to ventilate the closet bowl. Upstream of this nozzle the water flows through restriction 44 causing a reduction in pressure at the throat of such restriction. Inasmuch as this throat is connected via conduit 45 to the bottom of trapway 43 the water providing water seal 47 is withdrawn through conduit 45, flowing through restriction 48 into restriction 44 and thence downwardly through aspirator nozzle 41. In this manner the water seal 47 is removed so as to establish communication between the closet bowl and the soil pipe.

It will be noted that upstream of restriction 44, pressurized water is being supplied laterally, when valve 38 is open, to chamber 50. The pressure of this water presses valve closure 51 against its seat 53. Some of this water bypasses valve closure 51 and flows through passage 58 and communicating conduit 56 into closed receptacle 55. In this receptacle the level of water gradually rises, compressing the body of air trapped thereabove. This situation continues as long as valve 38 remains open or until a pressure, due to the compression of air in receptacle 55, is developed on the water equal to that in conduit 40 so that no additional water will flow into this receptacle.

When valve 38 is restored to the position shown in FIG. 1 or closed, in a manner hereinafter explained, the supply of pressurized water to conduit 40 is terminated. This removes the pressure from the right side of valve closure 51 and allows the pressurized fluid built up in receptacle 55 to exert itself against the left side of this valve closure causing the same to move rightwardly and close off conduit 54. At the same time, communication is established between conduits 56 and 52 through chamber 50. The pressurized water built up in receptacle 55 then flows via conduit 45 into trapway 43 to reestablish the water seal 47 therein. Restriction 48 restrains discharge of water from conduit 52 into conduit 40 so that most of the water from receptacle 55 flows through conduit 45.

Usually the flush tank of a water closet is operated when the ventilating operation is terminated, as will be explained later herein. Assuming for the moment that this occurs, it will be seen that conduit 59 allows additional water to enter trapway 43 so as to assure reestablishment of the water seal 47.

With this general understanding of the ventilating system in mind, the detailed structure providing such system will now be described.

Figure 2:
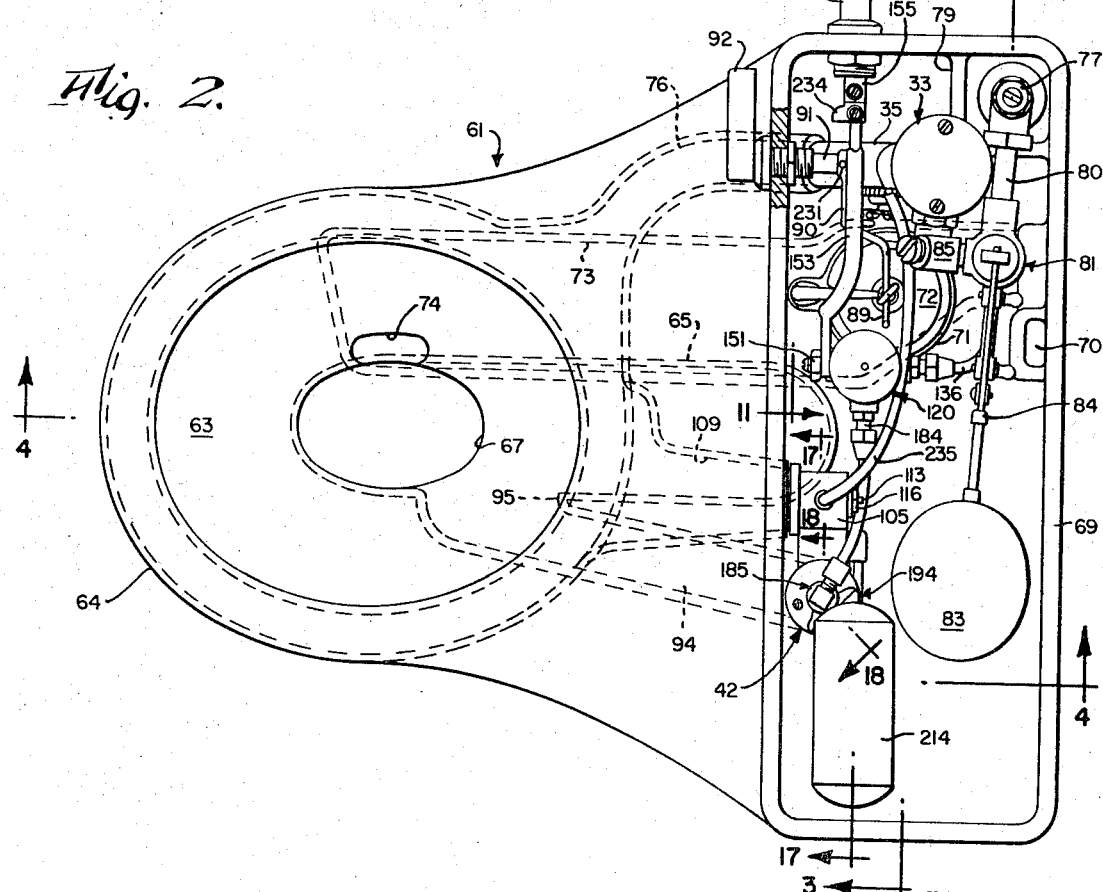
FIG. 2 is a top plan view of a water closet of the type mentioned in FIG. 1 and showing the same with the cover for the tank removed.
Figure 3:
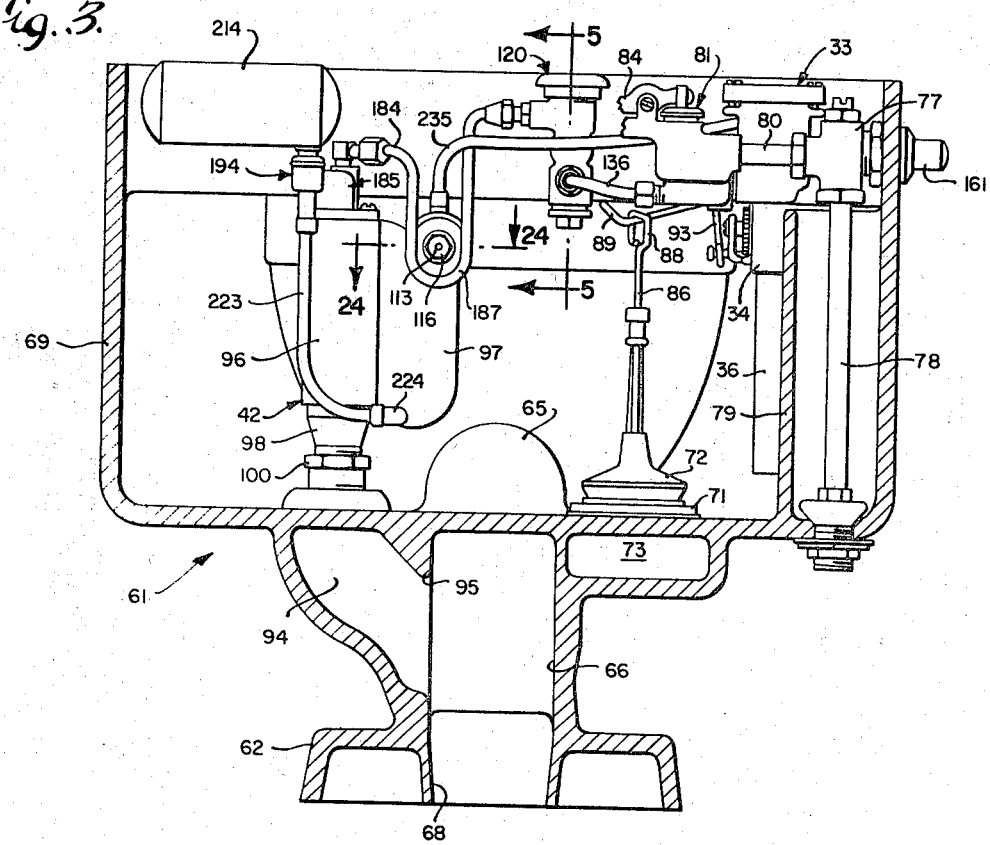
FIG. 3 is a vertical transverse sectional view thereof taken generally on line 3—3 of FIG. 2.
Figure 4:
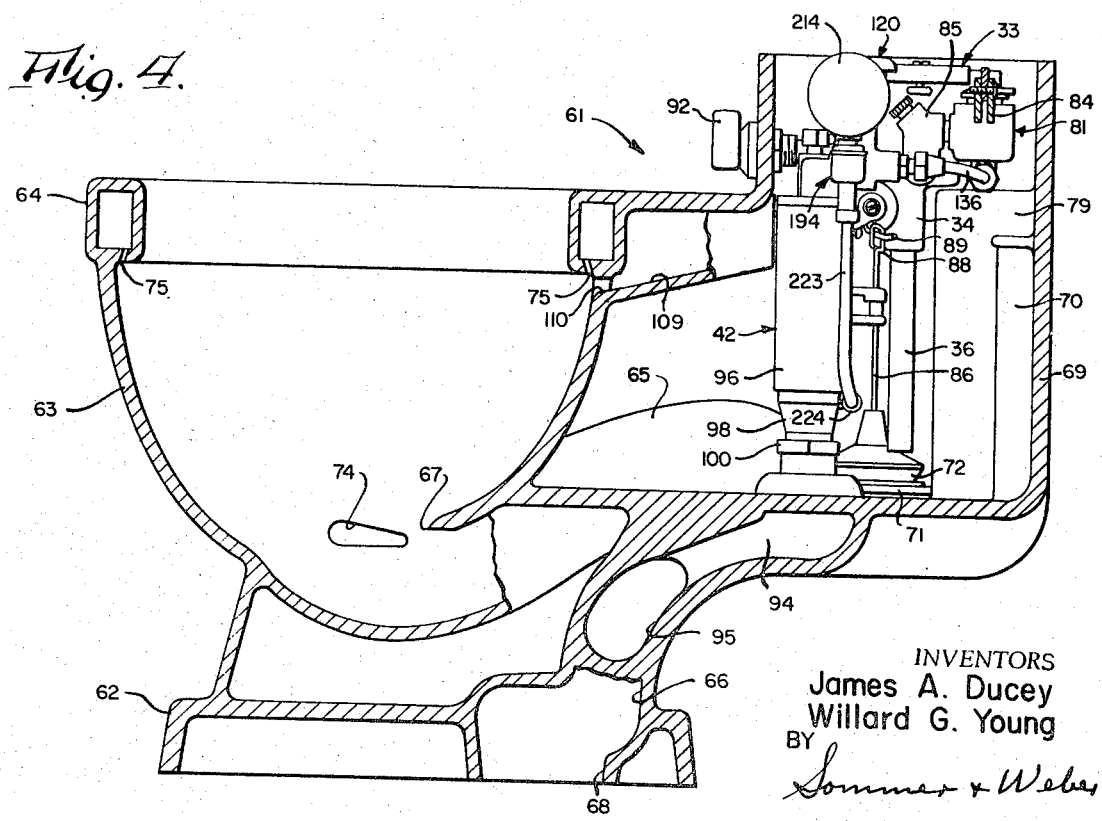
FIG. 4 is a vertical longitudinal sectional view thereof taken generally on line 4—4 of FIG. 2.

Referring to FIGS. 2–4, the water closet is represented generally by the numeral 61 and is shown as including a base 62 above which is supported a bowl 63 having a hollow rim 64. The bottom of this bowl 63 has an opening 67 in the lower end of an upleg 65 which continues into a downleg 66 which terminates in an opening 68 adapted to be connected to a soil pipe (not shown). Formed integrally with the bowl and base is a tank 69 adapted to contain water to a level corresponding to the upper end of overflow passage 70 formed on the rear wall of tank 69. The lower end of this passage communicates suitably with downleg 66 and ultimately discharge opening 68.

The bottom of tank 69 has an opening (not shown) normally surrounded by seat member 71 and adapted to be closed by a flush valve 72 adapted to engage this seat member. The opening surrounded by seat member 71 communicates with passage 73 which leads to an opening 74 in the wall of bowl 63 adjacent the bottom thereof. It is through this passage 73 and opening 74 that water flows to flush the closet bowl.

Water also enters bowl 63 through holes 75 in the bottom of the hollow rim 64. The water introduced through such holes flushes down the internal wall surface of bowl 63. This water enters the hollow rim 64 through passage 76 formed in the water closet.

In one rear corner of tank 69 a water supply pipe or riser pipe 78 is suitably arranged and is shown as surrounded by an integral dam wall 79. The upper end of this pipe 78 is communicatively connected to the inlet of a shut-off valve 77, the outlet of which is connected via conduit 80 to a ballcock device 81. This ballcock device includes a valve closure, schematically shown at 82 in FIG. 1, the down position of which with respect to its seat is controlled by a float 83 connected by suitable linkage 84 to the ballcock valve closure. The ballcock device 81 discharges water to an adjustable pressure regulator device 85 which in turn discharges water to an atmospheric vent device 33. As is well known to those skilled in the art the atmospheric vent device 33 is arranged in a conduit schematically shown at 32 in FIG. 1 which supplies water to diverter valve device 34 and via branch conduit 35 to passage 76 leading to hollow rim 64, or to branch conduit 36 which extends vertically downwardly into the lower portion of tank 69 and through which conduit the tank is filled with flush water.

Flush valve 72 has a vertical rod or stem 86 shown as formed with a loop 88 at its upper end through which the end portion 89 of a lift arm 90 extends. Arm 90 is shown as fast to one end of a shaft 91 journalled in the front wall of tank 69. On the outer end of this shaft 91 is suitably mounted a manipulatable actuator or flush lever 92 adapted to be manipulated by the user.

Figures 11, 12, 13:
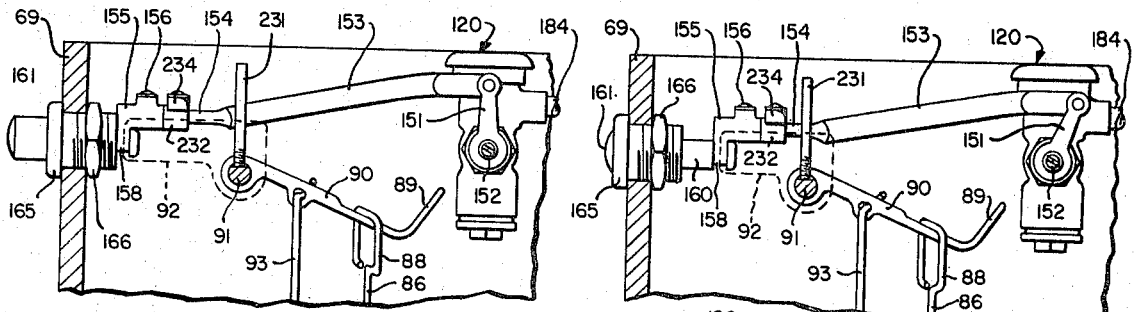
FIG. 11 is a fragmentary vertical sectional view of the actuating mechanism for the selectively operable valve means controlling the aspirating means of the ventilating system and showing such valve in a closed condition, taken generally on line 11—11 of FIG. 2.
FIG. 12 is a view similar to FIG. 11 but showing the valve actuated to an open condition.
FIG. 13 is a view similar to FIGS. 11 and 12 and showing restoration of the valve actuating mechanism to its initial position shown in FIG. 11 when the water closet if flushed.

As best shown in FIGS. 11–13, lift arm 90 also has connected thereto a rod 93 which is operatively associated with the movable valve element of diverter valve device 34 so that when flush lever 92 is depressed and arm 90 is raised diverter valve actuator rod 93 is also raised, causing the diverter valve to establish communication between conduits 32 and 35 initially. When flush valve 72 reseats lift arm 90 returns from the position shown in FIG. 13 to that shown in FIG. 11 and the movable valve element of diverter valve device 34 is moved so as to establish communication between valve conduits 32 and 36.

What has been described so far in connection with FIGS. 2–4 and 11–13 is known apparatus. The apparatus forming the ventilating system described in connection with FIG. 1 will now be described in greater detail as to structure.

Figure 17:
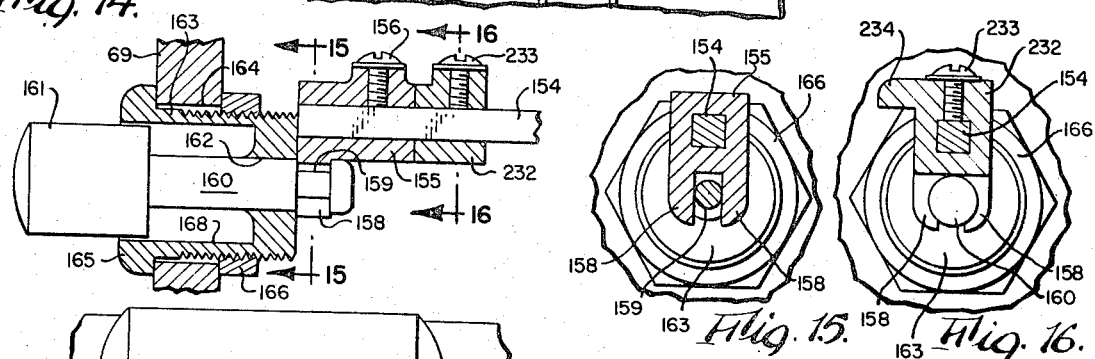
FIG. 17 is an enlarged vertical sectional view, partly in elevation, of a portion of the ventilating apparatus for the water closet, taken generally on line 17—17 of FIG. 2.

The water closet 61 is formed to provide a passage 94 (FIGS. 2, 3 and 4) below tank 69. The upper end of this passage 94 connects with an opening 102 (FIG. 17) in the floor of this tank, and the lower end of this passage connects with side opening 95 in downleg 66. A ventilator passage device or member, indicated generally at 42, is provided inside tank 69 and, as best shown in FIG. 17, includes a vertical passage portion 96 and a U-shaped trapway portion 97. The lower end of vertical passage portion 96 is shown in FIG. 17 as slidably and sealingly receiving the upper enlarged portion of a discharge tube 98. The lower reduced end portion of this tube 98 is externally threaded to receive a lower nut 99, and an upper gland nut 100. An intermediate annular packing 101 engages the wall of opening 102. In this manner, the interior of ventilator passage member 42 communicates with passage 94.

The trapway portion 97 of member 42 corresponds to trapway 43 shown in FIG. 1. More specifically, member 42 is formed with a recessed portion into which a dividing wall 103 extends downwardly as a continuation from a cover 104 for vertical passage portion 96. The upper upstream end of the U-shaped portion 97 is closed by a cylindrical cover portion 105 closed at its rear end, but open at its front end. Referring to FIG. 24, this front open end is provided by opening 106 which communicates with an opening 108 provided at the rear end of a passage 109 formed in the water closet. The front end of this passage 109 leads to openings 110 provided in the rear wall portion of bowl 63 immediately below rim 64.

Referring still to FIG. 24, a gasket 111 is shown interposed between member 42 and the end of the water closet portion 112 surrounding opening 108. This gasket is compressed by a T-shaped tie rod 113 the pivoted head 117 of which engages a shoulder 114 on member 112 surrounding opening 108. The shank of this tie rod extends through openings 108 and 106 and through a hole in the opposite wall 115 of member 42. A nut 116 is screwed onto the outer threaded end of shank 113 and compresses a gasket 118 against wall 115 and seals the opening therein through which tie rod 13 extends.

Both the selectively operable valve device 38 and the atmospheric vent device 37 shown in FIG. 1, are actually incorporated in the assembly represented at 120 shown in FIG. 3 and in section in FIGS. 5–10. Referring to these latter figures, assembly 120 includes a generally tubular body 121 having a lower recess 122 closed at its lower end by a removable plug 123 and having its upper end communicating via a restricted vertical cylindrical hole 124 with an intermediate chamber 125, in turn communicating through a cylindrical passage 126 with an upper compartment 128. The lower end of hole 124 is surrounded by a raised annular ridge to provide an annular seat 129 for a valve closure 130. This valve closure has a plastic ring portion 131 which actually engages seat 129, and a downwardly extending stem 132 the lower end portion of which is guided in a recess 133 formed in plug 123. Valve closure 130 also includes an upper fluted stem portion 127 which is slidably arranged in hole 124 and the extreme upper end part of which projects into intermediate chamber 125. A foraminous screen 134 of cylindrical shape is interposed between plug 123 and the portion of body 121 surrounding seat 129 and this screen surrounds valve closure 130.

The lower compartment 122 has a lateral or side inlet 135 the outer end portion of which is internally threaded to receive the externally threaded end of a tube 136. This tube 136 leads to the upstream side of valve closure (not shown) in ballcock device 81. Tube 136 corresponds to conduit 39 in FIG. 1.

Valve closure 130 is urged upwardly against its seat 129 by a helical compression spring 138 which surrounds lower stem 132, and also by the pressure of water in lower compartment 122. This valve closure 130 is adapted to be unseated or moved downwardly against the urging of spring 138 by a cam 139. This cam is shown as being formed as an integral part of a horizontal shaft having an inner end portion 140 rotatably received in recess 141. An integral annular flange portion 142 limits the extent to which shaft end portion 140 enters recess 141. The other or outer end portion 143 of the aforementioned shaft has integrally formed adjacent its inner end an annular flange portion 144 and at its outer extremity a reduced but out-of-round portion 145. The wall portion of chamber 125 opposite from recess 141 has an enlarged opening which receives a washer 146, a packing 148 and a gland nut 149. A washer 146 engages an annular shoulder 150 formed on body 121 and also engages the outwardly facing end face of annular flange 144. Gland nut 149 has a threaded connection with body 121 so that by tightening this gland nut the packing 148 arranged between this nut and washer 150 is clamped about shaft portion 143 to prevent leakage along this shaft and also along the wall of the body recess in which packing 148 is arranged.

Mounted on the outer out-of-round shaft portion 145 is a lever 151, being held in position by a screw 152. The means for manipulating lever 151 are shown in FIGS. 11–16. Pivotally connected to the outer or upper end of lever 151, as by the pivot pin-screw 157, is a push rod 153. The end of rod 153 remote from lever 151 is square in cross section as indicated at 154. Embracing this square end portion 154 is a tubular member 155 which carries a set screw 156 adapted to be tightened down against end portion 154. This member 155 has a pair of downwardly extending spaced apart fingers 158. These fingers 158 are shown as arranged in a groove 159 in the stem 160 of a plunger 161. The stem 160 is slidably received in a hole 162 provided in a guide member 163. This guide member is mounted in a hole 164 in a side wall of tank 69. Member 163 at its outer end has an enlarged annular head 165 which bears against the outer surface of the tank side wall, and the inner end portion of member 163 is externally threaded to receive a nut 166 which bears against the inner surface of the tank side wall. Member 163 is also shown as having a recess 168 adjacent its outer end to accommodate the enlarged head portion 161 of the plunger when the same is depressed as depicted in FIG. 12.

By depressing this plunger 161, push rod 153 is caused to move from the position shown in FIG. 11 to that shown in FIG. 12 whereby lever 151 is rotated in a clockwise direction as viewed in these figures, or moved from the position shown in FIG. 5 to that shown in FIG. 6. This causes cam 139 to be rotated in a clockwise direction as viewed in FIG. 10 to move the same from the position shown in FIG. 5 to that shown in FIG. 6 during which valve closure 130 is moved from its seated closed position to its unseated open position. This allows pressurized water entering through inlet 135, after being strained by screen 134, to flow upwardly from chamber 122 through hole 124 into chamber 125 and thence upwardly through hole 126 into chamber 128.

Mounted on the upper end of body 121 is a cap member 170 having a threaded connection with body 121 as indicated at 171. This cap member has a central vent opening 172 and a plurality of upstanding lugs 173. Arranged over cap member 170 is a hood member 174 which is supported on lugs 173. Hood member 174 carries a centrally disposed depending guide rod 176 suitably secured thereto. Slidable on this rod 176 is a vent closure member 178 which includes a head portion 179 adapted to engage the lower surface of cap member 170 surrounding vent hole 172 so as to close this hole. Member 178 also includes an integral annular depending skirt portion 180, the lower edge of which is adapted to engage the floor of chamber 128 surrounding hole 126 therein. This skirt portion 180 is shown as having a plurality of grooves 181 in the lower edge thereof at circumferentially spaced intervals. Water entering upper chamber 128 through hole 126 impinges against vent closure member 178 and urges the same upwardly along guide rod 176 until the head portion 179 of this member engages cap member 170 and closes vent hole 172.

Upper chamber 128 has a lateral outlet 182 as shown in FIGS. 7 and 10. Body 121 is formed to provide a nipple 183 which is internally threaded to receive the end of an externally threaded outlet tube 184. The other end of this tube 184 is externally threaded and received in a fitting 185. Intermediate its ends tube 184 is formed with a U-shaped trapway 187 (FIG. 3). The lower part of the body of fitting 185 is shown as including a reduced cylindrical stem portion 186 adapted to be received in a hole 188 provided in cover 104 for the ventilator passage member 42. From this stem portion 186 depends an integral nozzle tip 189 cylindrical on its external surface.

The body of fitting 185 also includes an integral laterally extending flange 190 the lower surface of which is coterminous with the body of the fitting at the base of stem portion 186 thereof for engagement with the upper surface of cover 104. As shown in FIGS. 18 and 22, a pair of screws 191 secure attaching flange 190 and thereby fitting 185 to cover 104.

Fitting 185 is also shown as having a vertical flat surface 192 engaged by the flat surface 193 of an auxiliary fitting represented generally by the numeral 194.

Main fitting 185 is shown as having a passage extending vertically therethrough including an upper enlarged portion 195 the upper end portion of which is internally threaded to receive the threaded end of tube 184 or an elbow connected to such tube. The aforementioned passage also includes a restricted portion 196 immediately below enlarged portion 195, a slightly larger portion 198 below portion 196, and a still further slightly enlarged lower portion 199 immediately below portion 198. Upper passage portion 195 includes a lateral conduit 200 which communicates with a counterbored portion 201 which opens to flat face 192.

Adjacent the juncture between restricted portion 196 and the next lower portion 198 is a laterally extending restricted passage portion 202 which at its outer end communicates with a counterbored portion 203 opening to flat face 192.

Auxiliary fitting 194 is shown as having a cylindrical neck 204 which is received in counterbored portion 201. The end face 205 of neck 204 is spaced from the bottom of the shoulder formed between counterbored portion 201 and passage 200 and provides therewith a chamber 206.

Auxiliary fitting 194 is also shown as having an upper horizontal passage 208 and a lower horizontal passage 209, both of which lead to and terminate in end face 205. Movably arranged in valve chamber 206 is a free-floating valve closure 210 in the form of a flat-sided disk. As shown in FIG. 20, neck 204 has a pair of grooves 211 so as to enable communication to be established between upper passage 208 and passage 200 even though valve closure 210 is seated against end face 205, as shown in FIG. 18.

The end of upper horizontal passage 208 remote from valve closure 210 is shown in FIG. 18 as communicating with the base of a vertically disposed cylindrical recess 212 formed in the body of auxiliary fitting 194. This recess 212 is adapted to receive the cylindrical stem 213 of a pressure tank or closed receptacle 214. Stem 213 has a passage 215 extending vertically therethrough and by which the interior of receptacle 214 is placed in communication with the base of recess 212 and in turn with passage 208.

The receptacle 214 is held in its mounted position on auxiliary fitting 194 by means shown in FIGS. 18 and 21. Such means include slots 216 in fitting 194 on opposite sides of stem 213 which register with an annular external groove 218 formed in this stem. Received in the registered slots 216 and groove 218 is a U-shaped retainer pin 219 the legs of which extend tangentially across groove 218 on opposite sides of passage 215.

Adverting again to FIG. 18, auxiliary fitting 194 is shown as having a vertical passage 220 which at its upper end communicates with passage 209 and at its lower end extends to the end of a nipple 221 formed on the body of auxiliary fitting 194. Extending between passage 220 and counterbore 203 is a horizontal passage 222 formed in the body of auxiliary fitting 194. As best shown in FIG. 3, a length of flexible tubing 223 engages at its upper end nipple 221 of auxiliary fitting 194 and at its lower end one end of an elbow-shaped nipple 224 the other end of which communicates with the bottom of trapway 43, corresponding to the connection at 46 depicted in FIG. 1. Tubing 223 corresponds to conduit 45 depicted in FIG. 1.

In order to aid in the aspirating effect of nozzle 199, a diffuser represented generally by the numeral 225 is shown, best in FIG. 18, as mounted on the nozzle tip portion 189 of main fitting 185. Diffuser 225 is shown as being in the form of a sleeve 226 embracing at its upper end the tip portion 189 and adjacent its lower end carries a horizontal screen or mesh disk 227. The margin of this disk is shown as engaging a downwardly facing shoulder 228 formed in sleeve 226 and is held thereagainst by a retainer ring 229 inserted in the lower end of sleeve 226. Intermediate screen 227 and nozzle tip 189, sleeve 226 is provided with a plurality of rectangularly shaped openings 230, three such openings being provided as best shown in FIG. 23.

Figures 14, 15, 16:
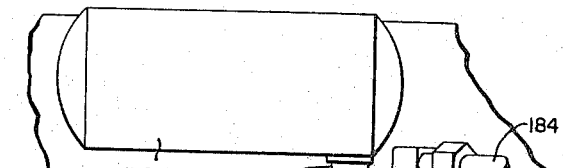
FIG. 14 is an enlarged fragmentary vertical sectional view of the actuating mechanism shown in FIGS. 11–13.
FIG. 15 is a vertical transverse sectional view thereof taken on line 15—15 of FIG. 14.
FIG. 16 is a vertical transverse sectional view thereof taken on line 16—16 of FIG. 14.

Means are provided for automatically closing the selectively operable valve device 120 after the same has been previously opened by selective operation thereof. Such automatic closing means are effective when the tank 69 is flushed, by lifting flush valve 72, and are illustrated in FIGS. 2, 11, 12, 14 and 16. The hub of lift arm 90 carries a radially extending generally upstanding rigid pin 231. This pin extends along the front side of push rod 153 which carries a sleeve member 232 secured thereto by a set screw 233 and has a radially extending forwardly projecting integral lug 234, as best shown in FIG. 16. Pin 231 is adapted to engage lug 234 as depicted in FIG. 13. Sleeve member 232 is immediately adjacent attaching sleeve member 155, shown mounted on the square portion 154 of push rod 153.

In order to assure a supply of water for refilling water seal 47 depicted in FIG. 1, a length of flexible tubing 235 is shown in FIGS. 2 and 3 as being connected at one end to a nipple on the top of ventilator passage member 42 and at its other end to atmospheric vent device 33. Tubing 235 corresponds to conduit 59 depicted in FIG. 1.

While a floor mounted water closet was illustrated, the invention is equally applicable to a wall hung closet.

OPERATION OF FIGS. 1–24

It is assumed that flush tank 69 is filled with water to its normal level, flush valve 72 being closed as in FIG. 3 so that flush lever 92 and associated lift arm 90 are in the positions depicted in FIGS. 2, 11 and 13. Likewise, selectively operable valve device 120 is in a closed condition so that the control lever 151 is in the position depicted in FIG. 11. This positions plunger 161 in its outer position as depicted in FIGS. 2, 11, 13 and 14.

When the user desires to render the ventilating system effective, plunger 161 is depressed to the condition depicted in FIG. 12. This causes push rod 153 to swing valve control lever 151 to the position depicted in FIG. 12. This moves cam 139 from the position shown in FIG. 5 to that shown in FIG. 6, thereby causing valve closure 130 to be forced downwardly and establish communication between lower chamber 122 and intermediate chamber 125. Inasmuch as lower chamber 122 is always supplied with water under pressure via tube 136, water under pressure flows upwardly through the now connected chambers into upper chamber 128, impinging against vent closure member 179, forcing the same upwardly against its seat closing vent hole 172. The pressurized water flows laterally from this upper chamber 128 through outlet tube 184 and thence into and through connected passages 195, 196, 198 and 199 in main fitting 185 mounted on top of the ventilator passage member 42. In passing through passages 196 and 198 the velocity of the water is increased and its pressure consequently decreased causing a reduced pressure to be produced in connected passages 202, 203, 222 and 220. Pressurized fluid in passage portion 195 and lateral portion 200 forces valve disk 210 against surface 205, thereby closing the end of passage 210 and blocking communication between passage 209 and valve chamber 206. Since passage 220 is connected via tubing 223 to the bottom of the trapway 43, the water normally therein to provide the water seal is aspirated from this trapway, flowing upwardly through tubing 223 and connected passages 220, 222, 203 and 202 into the vertical passage in main fitting 185. This water as well as that supplied by the tube 184 is discharged downwardly through diffuser 225. The water impinges against screen 227. The effect of water being discharged from nozzle passage 199 as well as being discharged downwardly through the tubular diffuser 225 having the side openings 230 therein and being broken up into a spray by being forced through the interstices of screen 227, causes an aspirating or suction effect upon the upper end of the downstream side of the trapway and withdraws gas through the now open trapway away from the toilet bowl through openings 110 (FIG. 24), such gas flowing through passages 109, 108, 106 into the upper end of the upstream leg of the trapway. As previously pointed out, and as shown in FIG. 17, the ventilator passage member 42 is connected to passage 94 in the water closet which leads to the outlet 68 which is connected to the soil pipe (not shown).

In this manner a flow of air and other gases that may be objectionable and generated adjacent bowl 63 are caused to flow through the ventilator passage member 42 toward the soil pipe. While this is occurring, pressurized water from passage 195 in main fitting 185 flows through lateral passage 200 into chamber 206 and through grooves 211 into passage 208 and thence into recess 212 and upwardly through passage 215 into the interior of receptacle 214. The level of water rises in receptacle 214, compressing the body of air trapped thereabove. This continues until the pressure due to such compression of air equals that of the entering water, or if this point of equilibrium is not reached due to flushing of the water closet by manipulation of flush lever 92. When flush lever 92 is depressed from the position shown in FIGS. 11 and 12 to that shown in FIG. 13, flush valve rod 86 is elevated, lifting flush valve 72 off its seat 71 and allowing the body of water in tank 69 to flow through passage 73 and outlet 74 into the bowl 63. When lift lever 90 is elevated, rod 93 connected to the diverter valve, represented schematically at 34 in FIG. 1, causes water to be directed toward the hollow rim 64 initially to flow from this hollow rim through holes 75 and wash down the inner wall surface of bowl 63. As the level of water in flush tank 69 descends, flush valve 72 which is floating on the surface thereof, also descends until ultimately reseating on seat member 71. During such descent of the flush valve, lift arm 90 is returned from the position shown in FIG. 13 to the position shown in FIG. 11 or 12.

When flush lever 92 was originally depressed from the position shown in FIG. 11 or 12 to that shown in FIG. 13, pin 231 engaged lug 234 and returned push rod 153 with its plunger 161 at one end from the condition shown in FIG. 12 to the condition shown in FIG. 11. At the same time valve control lever 151 was swung in a counter-clockwise direction and returned the selectively operable valve device 120 from an open condition shown in FIGS. 12 and 6 to a closed condition shown in FIGS. 11 and 5.

When the supply of pressurized water to valve chamber 206 in fitting 185 ceases, due to closing of valve device 120, the pressurized water stored in receptacle 214, corresponding to receptacle 55 in FIG. 1, exerts itself against valve closure 210, unseating the same and moving it to the position depicted in FIG. 19 in which it closes off lateral passage 200. This unseating of valve closure 210 establishing communication between passages 208 and 209 and the water is forced on through passage 220, tubing 223 and elbow 224 into the bottom of trapway 43, gradually filling the same. The restriction 202 prevents the escape of any substantial part of the water from passage 220.

As is well understood by those skilled in the art, when the level of water in flush tank 69 lowers, so does the float 83 which through the linkage 84 causes the ballcock valve 81 to open and direct water toward the diverter valve device 34 (FIG. 1). As the level of water in the flush tank rises to its normally full elevation, during the refilling of tank 69, float 83 through linkage 84 causes ballcock valve device 81 to shut off and the water closet is again in the condition assumed for it when this explanation was commenced.

FIGS. 25–32

The embodiment of the invention illustrated in FIGS. 25–32 is generally similar to that disclosed in the preceding figures. The main difference is in the adaptation of the inventive ventilating system to a close-coupled water closet, that is, a water closet bowl above and on which a separate flush tank is mounted and connected to the bowl.

Here again, the schematic depiction of the second embodiment disclosed in FIG. 25 will be described before the detailed structure. The arrangement disclosed in FIG. 25 is similar to that disclosed in FIG. 1 and therefore the same reference numerals are employed, except as distinguished by the suffix a, to indicate like parts.

One of the differences between the arrangement disclosed in FIG. 25 and that disclosed in FIG. 1 is that the diverter valve 34 is eliminated and tank refill tube 36a is directly connected to conduit 32a. Another difference is that the ventilator passage member 42a includes an upstream modification indicated generally at 240 which permits an adjustable connection of the inlet end of the ventilator passage member to the hollow rim of the closet bowl. A further minor modification in FIG. 25 is that the sixth or auxiliary refill conduit 59a, instead of communicating with the top of the downleg of the trapway immediately adjacent the same is more remote and disposed upstream and has two openings 241 and 242. Water discharged from opening 241 is directed toward trapway 43a and water discharged from opening 242 refills a water seal in the adjustable connection indicated at 240.

Otherwise, the construction and operation of the ventilating system depicted in FIG. 25 is similar to that depicted in and previously explained with respect to FIG. 1.

Turning now to the structural details, the numeral 243 represents the close-coupled water closet which includes a base portion 244 on which integral bowl portion 245 is arranged. Bowl 245 has a hollow rim 246 with holes 248 therein immediately above the inner wall of bowl 245 for flushing down the same. As well, the bowl 245 is formed with a flush water passage 249 communicating with hollow rim 246 at the front end of the bowl. The rear of bowl 245 is formed with a rearwardly extending horizontal deck indicated at 250. This deck has a hole 251 through which water may be introduced into a passage 252 formed below deck 250 and communicating with hollow rim 246 for supplying water to the same.

Matter is discharged from bowl 245 through an upleg 253 and thence down a downleg 254 to a discharge opening 255 which is adapted to communicate with a soil pipe (not shown). Alongside downleg 254 and part of upleg 253 is a ventilator passage 256 which communicates at its lower end through a hole 258 with the downleg 254 and hence with discharge outlet 255. The upper end of passage 256 is shown in FIGS. 27 and 28 as being enlarged into a chamber 259. This chamber has an opening 260 in the upper wall thereof which is deck 250.

On this deck 250 is supported a separate flush tank 261. The bottom wall of this tank has three openings therein indicated at 262, 263 and 264. Extending through opening 262 is a fitting for mounting a water supply pipe or riser pipe 265. A ballcock valve device 266 of any suitable construction is shown connected to the upper end and supported on riser pipe 265. The valve element of this ballcock device is controlled by a float bulb 268 connected by linkage 269 to such valve element. When this ballcock valve device 266 is open it allows the flow of water to be discharged through filler tube 270 which is vertically disposed adjacent riser pipe 265 and the lower end of which is open and adjacent the floor of tank 261.

A flush valve device indicated generally at 271 has a housing component 272 including a tubular discharge portion 273 arranged in holes 263 and 251. Flush valve device 271 is of conventional construction. A gasket 274 is shown as interposed between housing component 272 and the bottom of tank 261. Another gasket 275 is shown arranged between tank 261 and deck 250. A nut 276 clamps housing component 272 against gasket 274, this nut being screwed on the tubular portion 273 which is externally threaded for this purpose.

Figure 32:
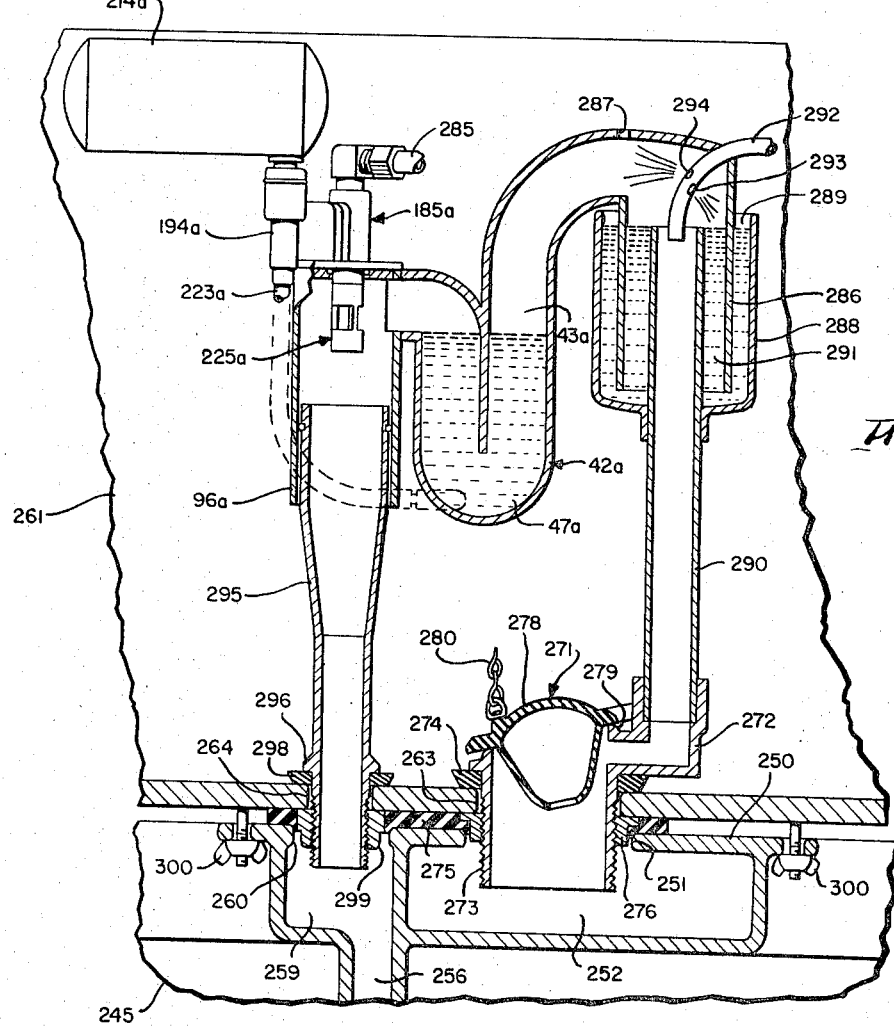
FIG. 32 is an enlarged fragmentary vertical sectional view of portions of the ventilating apparatus shown in FIG. 27, being taken generally on line 32—32 thereof.

Flush valve device 271 also includes a pivotally mounted flush valve 278, adapted when closed as depicted in FIG. 32 to engage seat 279. This valve 278 can be lifted by a chain 280, the upper end of which is shown connected to the end of a lift arm 281. This lift arm is suitably journalled on the front wall of tank 261 and is actuated by a manipulatable actuator or flush lever 282 mounted on the outside of this tank.

Figures 29, 30:
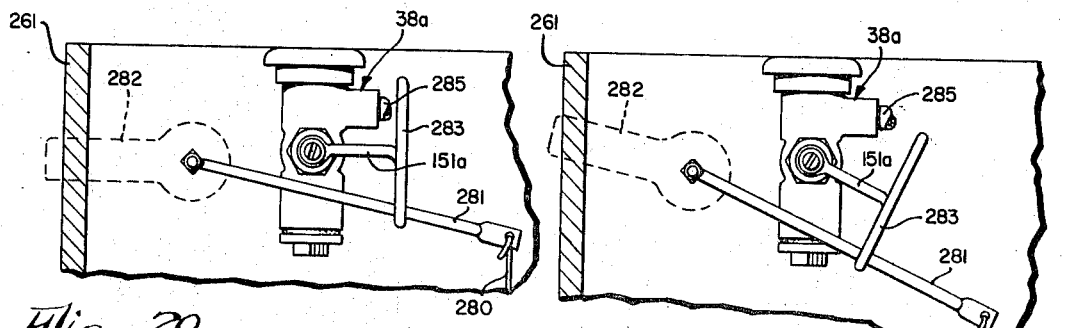
FIG. 29 is a fragmentary vertical sectional view showing the selectively operable valve means of the ventilating system associated with the mechanism for flushing the water closet, the aforementioned valve being illustrated in an off condition and the manipulator for flushing the tank being shown in its initial postion, this view being taken on line 29—29 of FIG. 26.
FIG. 30 is a view similar to FIG. 29 and showing the manipulator moved in one direction to open the aforementioned valve of the ventilating system.
Figure 31:
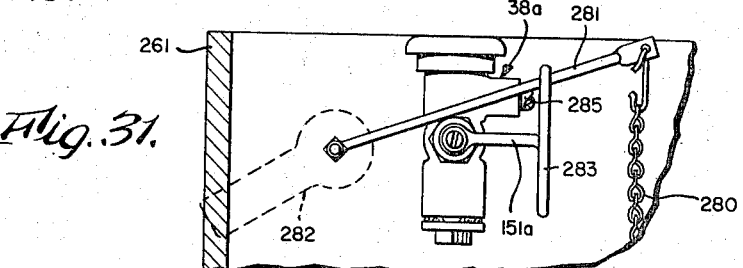
FIG. 31 is a view similar to FIGS. 29 and 30, but illustrating the manipulator moved in the opposite direction so as to release the water in the flush tank and also return the aforementioned valve of the ventilating system to an off condition.

Referring to FIGS. 29–31, selectively operable valve device 38a has its cam, corresponding to cam 39 shown in FIGS. 5, 6 and 10, actuated by movement of lift arm 281 in a clockwise direction which is effected by manipulating flush lever 282 also in a clockwise direction. For this purpose, a generally horizontal valve control arm 151a is fast to the outer end of cam shaft corresponding to shaft portion 143. The outer or free end of lever 151a is formed with a loop 283 through which lift arm 281 extends. When flush lever 282 is in its normal horizontal position depicted in FIG. 29, lift arm 281 is adjacent the closed bottom end of loop 283. Accordingly, when flush lever 282 is elevated or rotated in a clockwise direction as depicted in FIG. 30, lift arm 281 is moved downwardly against the closed lower end of loop 283 causing lever 151a to rotate in a clockwise direction. This will move the cam to which lever 151a is fast from a position corresponding to that depicted in FIG. 5 to that depicted in FIG. 6, thereby opneing valve device 38a. When this occurs water under pressure derived through an inlet tube 284 (FIG. 26) connected to riser pipe 265 upstream of ballcock device 266 is allowed to flow out outlet tube 285. This tube 285 corresponds to conduit 40a depicted in FIG. 25 and tube 184 disclosed in FIG. 3.

The main fitting 185a corresponds to fitting 185, as does auxiliary fitting 194a correspond to 194. Further, closed receptacle 214a corresponds to 214. The ventilator passage member 42a is similar to the one 42 disclosed in FIG. 17 except for the connection of the upstream end of this member to the closet bowl.

Referring to FIG. 32, the upstream end of member 42a is shown as having a depending tubular part 286. This is surrounded by an outer cup 288 and spaced therefrom to provide an annular space 289. Cup 288 is open at its upper end and closed at its lower end which embraces an inner tube 290. This inner tube acts as an overflow pipe and has its lower end mounted in housing component 272 and its upper end disposed at a level slightly below that of cup member 288. Tube 290 is also spaced from surrounding tube 286, such space being annular and being indicated at 291. Water fills the space 291 and substantially the space 289.

Water is adapted to be supplied to annular space 291 by a tubing 292, one end of which, being the upstream end, is connected to ballcock device 266 downstream of the valve element thereof, such connection being depicted at 297 in FIG. 26. The other or downstream end of tube 292 extends through a sealed hole in the wall of tube 286 adjacent the upper end thereof and the extremity of this tubing 292 is closed. However, adjacent this closed end, tube 292 has a first opening 293 and a second opening 294. Opening 293 is arranged so as to discharge water into annular space 291 as depicted in FIG. 32. Opening 294 is disposed so as to discharge water toward trapway 43a, as also depicted in FIG. 32. The openings 293 and 294 correspond to openings 241 and 242 shown in FIG. 25. The top wall of member 42a is shown as having a hole 287 for venting the space between water 47a and the water in annular space 291. Without this vent hole 287 these water seals will not fill.

The connection of the downstream end of ventilator passage device 42a is sealingly and adjustably connected to the upper end of a tube 295. The lower end of this tube extends through the registered openings 260 and 264. Tube 295 is shown as having an integral annular collar 296 which bears against a gasket 298 engaging the upper surface of the bottom wall of flush tank 261. The lower extremity of tube 295 is externally threaded to receive a nut 299 which bears against the lower surface of the bottom wall of flush tank 261. A portion of gasket 275 is shown as interposed between deck 250 and the bottom wall of flush tank 261 surrounding nut 299.

Flush tank 261 is shown as mechanically coupled to deck 250 by studs and wing nuts indicated at 300, two such elements being disclosed in FIGS. 27 and 32.

OPERATION OF FIGS. 25–32

The operation of the embodiment disclosed in FIGS. 25–32 is generally similar to that disclosed and described in the preceding figures with some difference hereinafter explained.

It is assumed that flush tank 261 is filled with a body of water the normal level of which is determined by the float 268. When the user desires to operate the ventilating system embodied in the structure disclosed in FIGS. 25–32, flush lever 282 is lifted upwardly or rotated in a clockwise direction about its pivotal axis as depicted in FIG. 30. This also swings lift arm 281 in a downward direction or also in a clockwise direction about the same pivotal axis. This lift arm 281 engages the closed lower end of loop 283 to cause valve control lever 151a to also swing in a clockwise direction, thereby opening the valve closure in valve device 38a and establish communication between inlet tube 284 and outlet tube 285. Water under pressure flows to the water operated aspirating means 185a, 194a and diffuser 225a, the latter corresponding to diffuser 225. This removes the water from water seal 47a in the trapway 43a of ventilator passage member 42a, such water leaving the trapway via tubing 223a which corresponds to tubing 223. This water from the water seal is discharged into the outlet end portion 96a of ventilator passage member 42a, and through tube 295 into chamber 259, thence through passage 256 and hole 258 into downleg 254. The removal of the water seal 47a from the trapway allows communication to be established through tube 290, hollow housing component 272 and passage 252 which leads to hollow rim 246 and communicates with holes 248 therein. In this manner, the interior of bowl 245 is placed in communication with the soil pipe and the water operated aspirator means causes the flow of gas from the bowl toward the soil pipe.

When the ventilating system is desired to be rendered inoperative, flush lever 282 is returned in a counterclockwise direction from the position shown in FIG. 30 to that shown in FIG. 29. Frequently it is desirable to flush the closet bowl at this time. This is effected by continuing to depress flush lever 282 to the position shown in FIG. 31. This raises lift arm 281 which pulls up on chain 280, lifting valve 278 off its seat 279 and allowing the water in tank 261 to be discharged through tubular portion 273 into passage 252 and on into the hollow rim 246. Rotation of flush lever 282 and lift arm 281 about their common pivotal axis in a clockwise direction as depicted in FIG. 31 causes the lift arm to engage the upper closed end of loop 283. This restores valve control lever 151a from the position depicted in FIG. 30, which shows the valve device 38a open, to the closed valve position for lever 151a depicted in FIG. 31.

Thereafter, flush lever 282 is released allowing this lever to return to its normal position depicted in FIG. 29. This will produce some slack in chain 80 due to the fact that valve 278 tends to remain open until the water level lowers in tank 261 so as to reseat valve 278 on its seat 279, as is understood by those skilled in the art.

When selectively operable valve device 38a is returned to its off position depicted in FIG. 31, the supply of pressurized water to the aspirating nozzle means 225a is cut off. This allows the compressed air in receptacle 214a to expand and force fresh water that had been stored therein to flow via tubing 223a into the bottom of the trapway 43a and fill this trapway. Filling of this trapway is also assured by water discharging through opening 294 in tubing 292.

It will be seen that the water filling annular spaces 289 and 291 up to the level of the upper end of overflow tube 290 provides a water seal blocking communication between the interior of flush tank 261 and the interior of the ventilator passage member 42a when aspiration is occurring. Also, such water seal filling spaces 289 and 291 cannot be aspirated into the interior of ventilating passage member 42a. Further, with the provision of opening 293 in tubing 292 it is assured that this water seal will always be fully provided, any excess water flowing over the rim of overflow tube 290 and being discharged into the soil pipe.

As understood by those skilled in the art, when flush valve 278 was opened the water level in tank 261 lowered dropping float bulb 268 and through linkage 269 opened the ballcock 266. After valve 278 reseats the water level in tank 261 rises until ballcock 266 is shut off, restoring the water closet to the condition first assumed.

Other changes and modifications in structure may occur to those skilled in the art. Therefore, the embodiments illustrated and described are illustrative and not limitative of the present invention which might be measured by the scope of the appended claims.

What is claimed is:

1. In a water closet including a bowl and a duct adapted to be communicatively connected to a soil pipe for carrying away discharge from said bowl, said bowl having at least one opening in a wall thereof above the normal level of water maintained therein, the improvement therein of means for removing odors from said bowl comprising means providing a trapway one end of which is communicatively connected to said opening and the other end of which is communicatively connected to said duct, said trapway normally containing water to provide a water seal between said opening and duct, selectively operable valve means including an inlet and an outlet, means for supplying water to said inlet, water operated aspirator means operatively associated with said duct downstream of said trapway, first conduit means communicatively connecting said outlet to said aspirator means, second conduit means communicatively connecting the bottom of said trapway to said first conduit means, means providing a free-floating valve chamber, valve closure means arranged in said chamber, third conduit means communicatively connected to said second conduit means and leading to said chamber terminating in a seat adapted to be closed by said valve closure means, fourth conduit means communicatively connecting said chamber to said first conduit means, means providing a closed receptacle, and fifth conduit means communicatively connecting the bottom of said receptacle with said chamber so as to communicate with said first conduit means when said valve closure means is seated on said seat, said valve closure means when unseated allowing communication to be established through said chamber between said second and fifth conduit means.

2. A water closet according to claim 1 wherein said first conduit means includes a first restriction means, and the communicative connection of said second conduit means to said first conduit means is at said first restriction means.

3. A water closet according to claim 2 wherein said second conduit means includes a second restriction means, and the communicative connection of said third conduit means to said second conduit means is between said second restriction means and said trapway.

4. A water closet according to claim 3 wherein the communicative connection of said fourth conduit means to said first conduit means is upstream of said first restriction means.

5. In a water closet including a bowl, a duct adapted to be communicatively connected to a soil pipe for carrying away discharge from said bowl, said bowl having at least one opening in a wall thereof above the normal level of water maintained therein, a flush water tank, ballcock means in said tank for filling said tank and a pipe for supplying water to said ballcock means, the improvement therein of means for removing odors from said bowl comprising means providing a trapway one end of which is communicatively connected to said opening and the other end of which is communicatively connected to said duct, said trapway normally containing water to provide a water seal between said opening and duct, selectively operable valve means including an inlet and an outlet, branch water supply means communicatively connecting said inlet to said pipe upstream of said ballcock means, water operated aspirator means operatively associated with said duct downstream of said trapway, first conduit means communicatively conecting said outlet to said aspirator means and including first restriction means, second conduit means communicatively connecting the bottom of said trapway to said first conduit means at said first restriction means and including second restriction means, means providing a valve chamber, free-floating valve closure means arranged in said chamber, third conduit means communicatively connected to said second conduit means between said second restriction means and said trapway and leading to said chamber terminating in a seat adapted to be closed by said closure means, fourth conduit means communicatively connecting said chamber to said first conduit means upstream of said first restriction means, means providing a closed receptacle, fifth conduit means communicatively connecting the bottom of said receptacle with said chamber so as to communicate with said first conduit means when said valve closure means is seated on said seat, said valve closure means when unseated allowing communication to be established through said chamber between said second and fifth conduit means, and sixth conduit means for auxiliary water refill of said trapway communicatively connected to said ballcock means on the downstream side thereof.

6. A water closet according to claim 5 which further comprises means, effective when said tank is flushed, for automatically closing said selectively operable valve means after the same has been previously opened by selective operation thereof.

7. A water closet according to claim 5 which further comprises flush valve means including a manipulatable actuator, and means operatively interposed between said flush valve means and said selectively operable valve means and operative when said actuator is manipulated from a given position to return said selectively operable valve means to a condition blocking communication between said inlet and outlet if such valve means had been previously selectively operated to establish communication between said inlet and outlet.

8. A water closet according to claim 5 wherein said aspirator means includes a tubular member through which water is discharged downwardly and having side openings and a screen arranged below said openings impinged by such water.

References Cited

UNITED STATES PATENTS

| | | | |
|---|---|---|---|
| 1,971,880 | 8/1934 | Taylor | 4—13 |
| 2,603,797 | 7/1952 | Baither | 4—215X |
| 2,851,696 | 9/1958 | Schotthoefer | 4—216 |
| 3,188,658 | 6/1956 | Dixon | 4—215 |

FRED C. MATTERN, Jr., Primary Examiner

D. B. MASSENBERG, Assistant Examiner

UNITED STATES PATENT OFFICE
CERTIFICATE OF CORRECTION

Patent No. 3,548,424          Dated December 22, 1970

Inventor(s) James A. Ducey and Willard G. Young

It is certified that error appears in the above-identified patent and that said Letters Patent are hereby corrected as shown below:

Column 3, line 3, "27" should be --26--.

Column 6, line 14, "13" should be --113--.

Column 8, line 10, omit "which" before "opens".

Column 14, line 28, "might" should be --is to--.

Column 14, line 48, "free-floating" should be inserted before the word "valve" (second occurrence), and omitted before "valve" (first occurrence).

Signed and sealed this 27th day of June 1972.

(SEAL)
Attest:

EDWARD M. FLETCHER, JR.      ROBERT GOTTSCHALK
Attesting Officer             Commissioner of Patents